United States Patent [19]
Russell

[11] 3,818,358

[45] June 18, 1974

[54] NOISE REJECTION CIRCUIT FOR DIGITAL SYSTEMS

[75] Inventor: Stanley L. Russell, West Webster, N.Y.

[73] Assignee: Stromberg-Carlson Corporation, Rochester, N.Y.

[22] Filed: Dec. 29, 1972

[21] Appl. No.: 319,837

[52] U.S. Cl. .................. 328/163, 307/234, 328/48, 328/112, 328/119

[51] Int. Cl. ...................... H03b 1/04, H04b 15/00

[58] Field of Search ............ 328/48, 111, 112, 119, 328/162, 165; 307/234

[56] References Cited

UNITED STATES PATENTS

| | | | |
|---|---|---|---|
| 3,568,071 | 3/1971 | Kocher | 328/48 |
| 3,676,699 | 7/1972 | Warren | 328/112 X |

*Primary Examiner*—John Zazworsky
*Attorney, Agent, or Firm*—Charles C. Krawczyk; William F. Porter, Jr.

[57] ABSTRACT

A noise rejection circuit including a pair of lockup counters, wherein separate counters are enabled by different states of digital signals applied thereto to count clock pulses during the presence of the signals, and in response to counting a preset number of clock pulses to reach a lockup condition. A reset circuit is provided between the lockup counters so that in response to the change in the state of digital signals for a duration covering a preset number of clock pulses one lockup counter resets the other and vice versa. An output circle is included in at least one lockup counter that provides output signals corresponding to the input signals less noise pulses.

12 Claims, 2 Drawing Figures

NOISE REJECTION CIRCUIT FOR DIGITAL SYSTEMS

BACKGROUND OF THE INVENTION

This invention pertains to noise rejection circuits, and more particularly to a digital circuit for receiving digital signals and repeating the digital signals while rejecting noise thereon.

In digital systems it is important that digital signals are distributed between various transmitting and receiving circuits while minimizing the possibility of responding to transients or noise pulses. For example, if transient or noise pulses were included along with system clock pulses, the digital circuits may erroneously respond to the transient or noise pulses and perform operations out of synchronization with a designated timing sequence. In the event that digital data is being transmitted, a transient or noise pulses may be erroneously accepted as digital data causing an erroneous operation or calculations. One of the prior art methods minimizing the effect of such noise pulses utilizes a capacitive-gating circuit to filter the noise spikes. Such an arrangement is not very satisfactory since capacitors come with a very wide range of tolerance in their designated microfard values. This is especially true in the case of electrolytic capacitors wherein the tolerance may range between minus 50 percent to plus 200 percent. As a result, a capacitor having a designated value selected to provide a certain filtering response may in fact have a much larger value than indicated thereon, thereby possibly tending to undesirably integrate the rise and fall times of the digital signals. The larger the capacitor used, the greater the amount of integration and the slower the rise and fall times. This is highly undesirable since it is well known that if the transition time of digital logical circuits, such as the transistor-transistor logic circuits and the diode transistor logic circuits, is slow, the circuit remains in a linear range of operation for a period of time that may possibly be sufficient to cause the switching circuit to break into oscillation, thereby generating its own noise.

It is therefore an object of this invention to provide a new and improved noise rejection circuit for digital circuits.

It is also an object of this invention to provide a new and improved digital noise rejection circuit that does not include any capacitive components.

It is still a further object of this invention to provide a new and improved noise rejection circuit that includes a digital timing arrangement for rejecting noise.

BRIEF DESCRIPTION OF THE INVENTION

A noise rejection circuit for digital signals including the first and second lockup counters responsive to opposite states of digital signals applied thereto for enabling the counters to count clock pulses during the presence of the signals and in response to counting a preset number of clock pulses to reach a lockup condition. Reset circuit means are provided between the lockup counters so that when one counter reaches a preset count, the lockup counter applies a reset signal to the other lockup counter. At least one of the lockup counters includes an output stage for providing output digital signals free of input signal noise pulses that have a duration less than a preset number of clock pulses. The lockup counters can, for example, count to three clock pulses to reach lockup and can provide a reset signal for a count less than three clock pulses, such as two clock pulses.

A further feature of the invention includes an automatic reset circuit for resetting the appropriate lockup counter in the event that both lockup counters are in their lockup condition when initially energized.

DETAILED DESCRIPTION OF THE INVENTION

Figure 1:
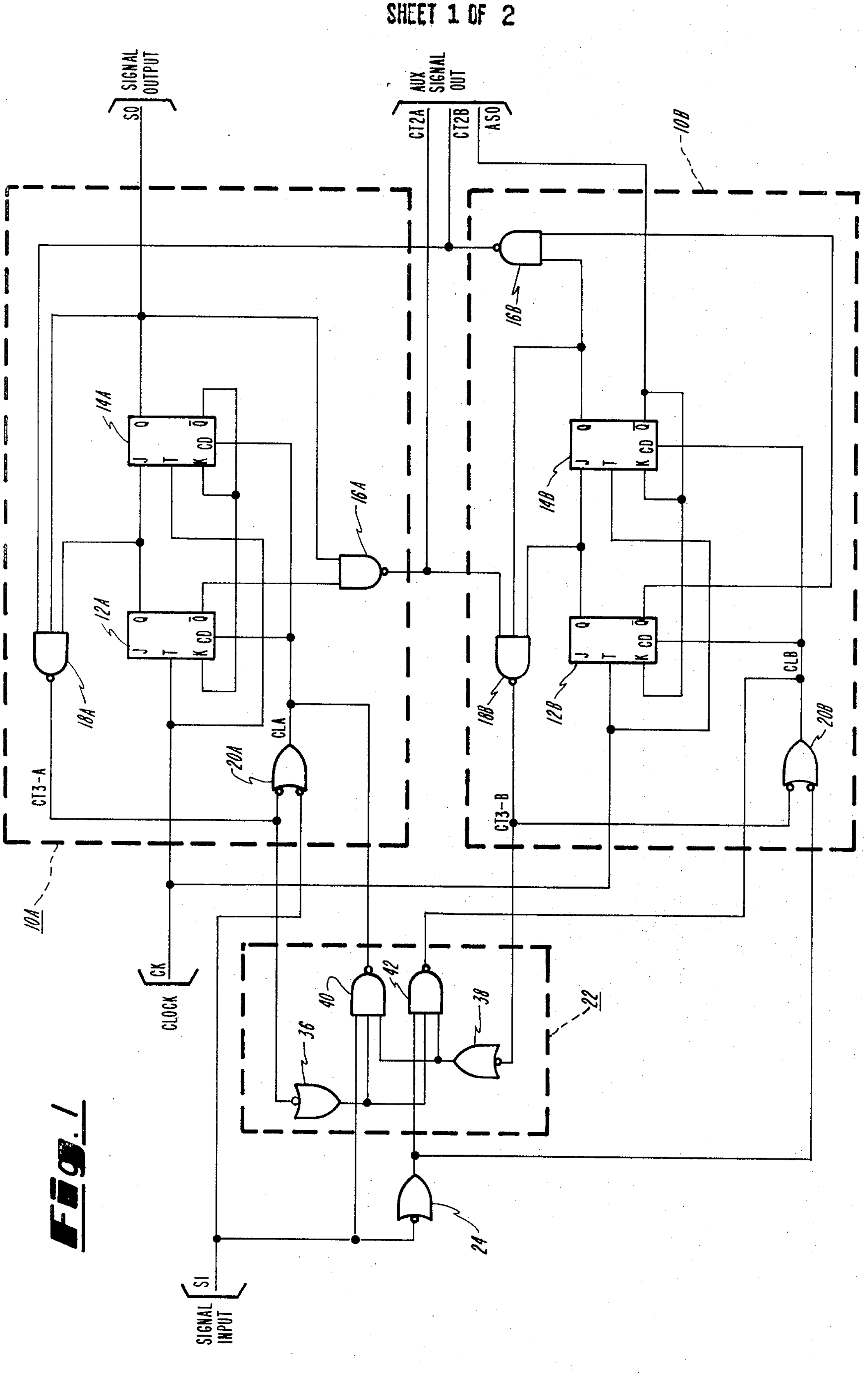
FIG. 1 is a logic diagram of the noise rejection circuit of the invention.

The noise rejection circuit of the invention includes two lockup counters 10A and 10B. The circuits of the lockup counters 10A and 10B are the same. For purposes of simplifing the explanation of the Figures, identical components in each lockup counter are identified by the same reference numerals followed by an appropriate suffix (A or B). Each lockup counter 10A and 10B includes a counter circuit comprising two flip-flop circuits 12 and 14. Timing pulses from a fast clock (having a repetition rate substantially greater than the input digital signal being monitored) are applied to lead CK, which in turn is connected to the T input circuits of each of the flip-flops 12 and 14 in each of the lockup counters 10A and 10B. The Q output of flip-flop 12 is connected to the J input of flip-flop 14, while the K input of both the flip-flops 12 and 14 are connected to the $\bar{Q}$ output of the flip-flop 14. The signal output lead SO is connected to the $\bar{Q}$ output of flip-flop 14A. The arrangement is such that when a high signal is present on the lead CLA or CLB in the lockup counters 10A and 10B, respectively, the corresponding flip-flops 12 and 14 are enabled to count three clock pulses, after which time both flip-flops 12 and 14 are set and remain set until the lead CLA or CLB is returned to ground. If the high signal is removed prior to the count of three, the flip-flops are automatically reset. Although two flip-flops are included in each lockup counter 10A and 10B, it is to be understood, that any number of flip-flops can be used depending upon the number of clock pulses desired for reaching lockup and reset.

Each of the lockup counters 10A and 10B also includes two decoder gates, a count of two decoder gate 16 and a count of three decoder gate 18. When the flip-flop circuits 12 and 14 pass through the count of two, the gate 16 produces a pulse. When the flip-flops 12 and 14 have reached a count of three and are locked in this position, two inputs of the gate 18 are enabled. The other input of the gate 18 in each lockup counter is connected to the count of two gate 16 of the other lockup circuit.

The signals to enable the flip-flops 12 and 14 for counting and to clear or reset the flip-flops, are transmitted by either an OR gate 20, or an automatic reset circuit 22. The automatic reset circuit 22 functions in the event that when the power is initially turned on both lockup counters 10A and 10B may be in a count of three lockup condition, thereby inhibiting any further sequencing thereof. In such case, the automatic reset circuit 22, monitors the input signal on lead SI and determines, depending upon the phase (high or low) of the input signal, which of the two lockup counters 10A or 10B is to be reset.

Figure 2:
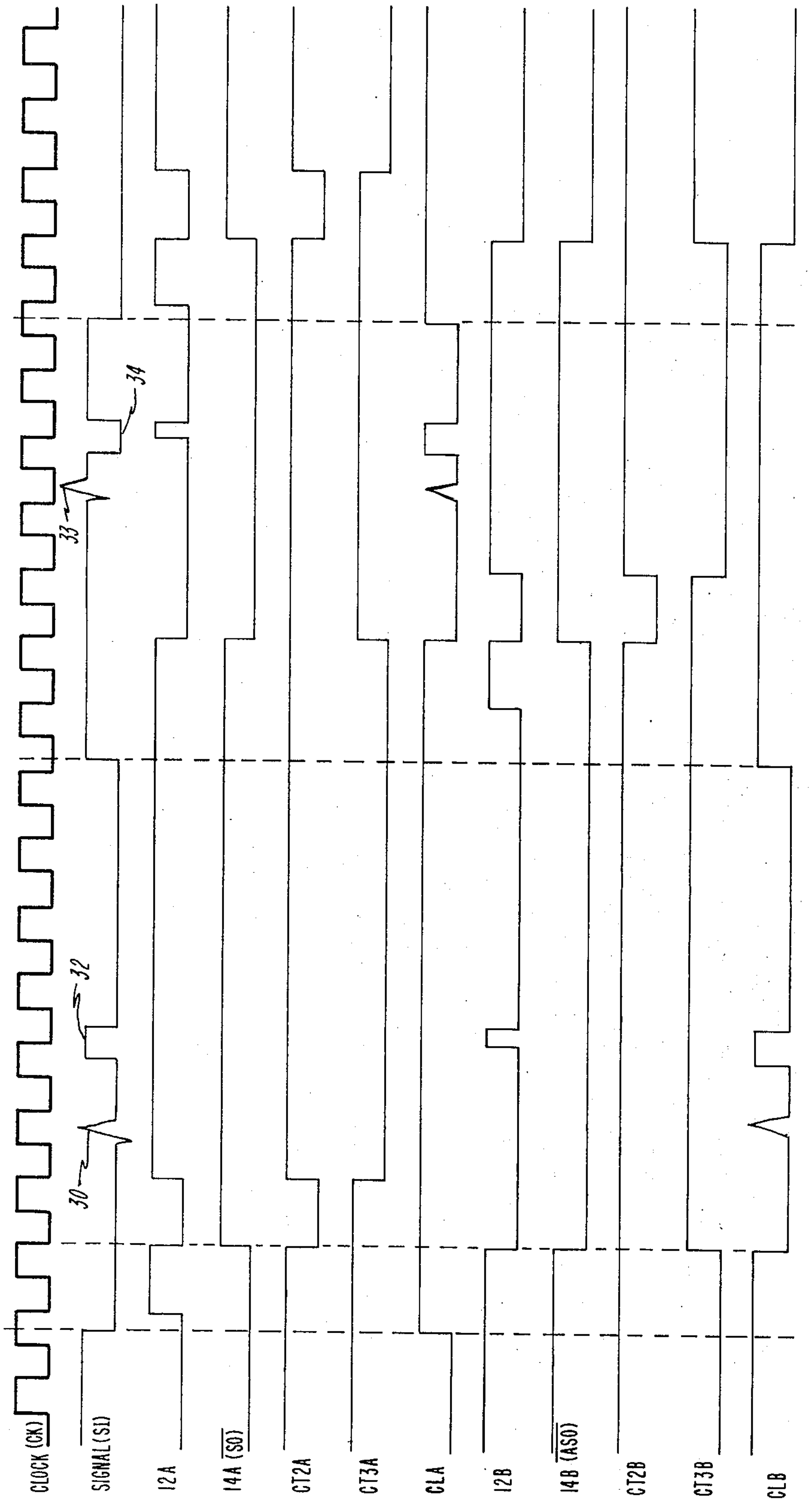
FIG. 2 is a plot of the wave forms of the noise rejection circuit of FIG. 1 used in explaining the operation thereof.

Input signals to the noise rejection circuit are applied to the lead SI while output signals are developed on the lead SO. In addition, auxiliary pulse type output signals are provided on the leads CT2-A and CT2-B while an inverted output signal is provided on lead ASO. Other output signals are available from the Q output of the flip-flops 14A and 14B. The timing sequences of the switching circuits of the lockup counters 10A and 10B are illustrated in FIG. 2. As illustrated in FIG. 2, the signal on lead SI is switched between states, or polarity or phase as high and low signals, with noise pulses thereon. In the particular embodiment of the invention illustrated in FIG. 1, the lockup counter 10A is responsive to low signals on lead SI while the lockup counter 10B is responsive to high signals. When the signal on lead SI goes low, the output of the OR gate 20A (lead CLA) goes high thereby enabling the first counter circuit comprising flip-flops 12A and 14A to count. When the lockup counter 10A reaches the count of two, a low signal is applied by the count of two gate 16A (via lead CT2A) to the input of the gate 18B thereby applying via the gate 20B a low signal to the lead CLB and clearing the flip-flops 12B and 14B (until a high input signal appears on lead SI). When the lockup counter 10A reaches a count of three, it is locked up and remains locked up until cleared by the reset circuit of lockup counter 10B. The occurrence of any transient or noise pulse causing flip-flop 12A to set and having a duration less than the time it takes the flip-flops 12A and 14A to count to two will result in clearing the flip-flop 12A before the flip-flop 14A is set. Therefore the transient or noise pulse is not propagated (output on the lead SO remains continuously high). If the signal is of sufficient duration that the count of three is reached, both the flip-flop circuits 12A and 14A are locked in a set condition and a continuous low output (corresponding to the input signal) is produced on the output lead SO until the flip-flops 12A and 14A are reset.

Subsequently thereafter, when the input signal on lead SI goes high, the OR gate 20A (lockup counter 10A) is inhibited from responding to the signal by the count of three AND gate 18A, and the high signal on the lead SI is inverted by the inverter 24 and applied to the OR gate 20B to produce a high signal on the lead CLB enabling the second counter circuit comprising flip-flops 12B and 14B (which were previously cleared when the lockup counter 10A reached a count of two). When the flip-flops 12B and 14B pass the count of two, the gate 16B is enabled to apply a low signal pulse (via lead CT2B) to the gate 18A. The gate 18A is thereby disabled which in turn disables the OR gate 20A and resets the flip-flops 12A and 14A to produce a high signal on the signal output lead SO corresponding to the input signal, and also allows the lockup circuit 10A to respond to the next subsequent low signal on lead SI. In addition, when the flip-flops 12B and 14B reach a count of three, they are locked up and remain locked up until cleared by the reset circuit of lockup counter 10A.

Noise pulses 30, 32 34 are included on the signal input in FIG. 2 to illustrate the noise rejection function of the circuit. The arrangement is such that the flip-flops are set on the trailing edge of the clock pulses CK. The noise pulses 30 and 33 do not occur during the fall time of a clock pulse and therefore are totally rejected by the circuit. The noise pulses 32 and 34 are of a much longer duration and occur during the fall time of the clock pulses. The noise pulse 32 is illustrated as a high going pulse occurring during the low period of the input signal. The noise pulse 34 is illustrated as a low going pulse occuring during a high period of the input signal. The effects of the high going noise pulse 32 and the low going noise pulse 34 are illustrated on wave forms 12B and 12A, respectively and CLB and CLA, respectively. As noted on wave form 12B, the flip-flop 12B is set by the simultaneous presence of the noise pulse 32 and the fall time of the clock pulse CK. However, since the noise pulse 32 is not present for two clock pulses, the flip-flop 12B is reset and the noise pulse 32 is rejected. In a similar manner the low going noise pulse 34 in conjunction with the fall time of the clock pulse CK sets the flip-flop 12A. However, the flip-flop 12A is reset before the counter 10A reaches a count of two and the noise pulse is rejected. Hence, it can be seen that any transients or noise spikes on the input lead SI having a duration less than the time it takes the flip-flops 12 and 14 to count to two, clears the flip-flop 12 before the flip-flop 14 is set and therefore the transient or noise signal will not be propagated. The duration of noise pulses that can be rejected depends upon the repetition rate of the clock pulses applied to line CK.

In effect one lockup counter monitors one polarity or state of input signals (such as low going signals) while the other one is inhibited from responding to that state of signal, and vice versa. The states of lockup counters 10A and 10B are switched by a change in state or polarity of signals that are of sufficient duration (at least two clock pulses) to indicate a valid signal pulse and not a transient noise or pulse.

As previously mentioned the autoreset circuit 22 resets the appropriate lockup counter 10A or 10B in the event that both lockup counters are switched to a count of three when the power is initially turned on. In such a case, the low outputs from the count of three gates 18A and 18B are transmitted via the inverter circuits 36 and 38, respectively, to both the reset gates 40 and 42. The input signal on lead SI is directly applied to the gate 40, and is also applied to the gate 42 via the inverter 24. The arrangement is such that in the event both of the lockup counters 10A and 10B are switched to a lockup condition at the time the power is initially applied to the circuit the polarity or state of the input signal (high and low) on the lead SI determines which lockup counter is to be cleared. For example, if the signal on SI is low, gate 42 is enabled and the counter 10B is cleared, while if the input signal is high the gate 40 is enabled and the lockup counter 10A is cleared.

I claim:

1. A noise rejection circuit for digital signals having first and second states comprising:

a first lockup counter including a first counter circuit and an input circuit responsive to the first state of said digital signals applied thereto for enabling said first counter circuit during the presence of said signals to count clock pulses and in response to counting a preset number of clock pulses to reach a lockup condition, said lockup counter including an output circuit;

a second lockup counter including a second counter circuit and an input circuit responsive to the second state of said digital signals applied thereto for enabling said second counter circuit during the presence of said signals to count clock pulses and in response to counting a preset number of clock pulses to reach a lockup condition;

first reset circuit means responsive to the enablement of said first counter circuit for a sufficient duration of time to count a preset number of pulses for applying a signal to reset said second lockup counter, and second reset circuit means responsive to the enablement of said second counter circuit for a sufficient duration of time to count a preset number of pulses for applying a signal to reset said first lockup counter.

2. A noise rejection circuit as defined in claim 1 wherein:

said preset numbers of clock pulses to which said first and second counter circuits count to reach the lockup condition are equal, and said preset numbers to which said first and second reset circuit means are responsive are equal and less than said preset number of clock pulses to reach the lockup condition.

3. A noise rejection circuit as defined in claim 2 wherein:

said first counter circuit includes a plurality of first flip-flop circuits interconnected so that when enabled said first flip-flop circuits count said preset number of clock pulses to reach the lockup condition;

said first lockup counter includes a decoder means responsive to the lockup condition of said first counter circuit and the signal to reset said first lockup counter for resetting the plurality of first flip-flop circuits;

said first reset circuit means includes a decoder circuit for generating said signal to reset said second lockup counter when the flip-flop circuits in said first counter circuit reach said preset count for reset;

said second counter circuit includes a plurality of second flip-flop circuits interconnected so that when enabled said second flip-flop circuits count said preset number of clock pulses to reach the lockup condition;

said second lockup counter includes a decoder means responsive to the lockup condition of said second counter circuit and the signal to reset said second lockup counter for resetting the plurality of second flip-flop circuits, and said second reset circuit means includes a decoder circuit for generating said signal to reset said first lockup counter when the flip-flop circuits in said second counter circuit reach said preset count for reset.

4. A noise rejection circuit as defined in claim 3 wherein:

said input circuit of said first lockup counter includes gating circuit means responsive to the first state of said digital signals for enabling the flip-flop circuits of the first lockup counter to count clock pulses, said gating circuit means connected to said decoder means of said first lockup counter and responsive thereto for resetting said first flip-flop circuits, and said input circuit of said second lockup counter includes second gating circuit means responsive to the second state of said digital signals for enabling the flip-flop circuits of the second lockup counter to count clock pulses, said second gating circuit means connected to said decoder means of said second lockup counter and responsive thereto for resetting said second flip-flop circuits.

5. A noise rejection circuit as defined in claim 4 including:

third reset circuit means receiving said digital signals and responsive to both the first and second lockup counters in the lockup condition for detecting the state of the digital signal and resetting said second lockup counter when the digital signal is in said first state and resetting said first lockup counter when the digital signal is in said second state.

6. A noise rejection circuit for digital signals having first and second states comprising:

first and second lockup counters responsive to the presence of enabling signals applied thereto for counting a preset number of clock pulses to reach a lockup condition and to reset in the event that the enabling signal is removed prior to reaching the lockup condition, at least one of said lockup counters including an output circuit for generating digital output signals;

circuit means receiving the digital signals for enabling the first lockup counter in response to one state of said digital signal and enabling the second lockup counter in response to the other state of said digital signals, and reset circuit means interconnecting said first and second lockup counters for resetting one of said lockup counters when the other of said lockup counters has counted a preset number of pulses.

7. A noise rejection circuit as defined in claim 6 wherein:

said preset number of counts for said reset circuit means is less than the preset number of counts for lockup.

8. A noise rejection circuit as defined in claim 7 wherein:

each of said first and second lockup counters includes a plurality of flip-flop circuits wherein the flip-flops in the lockup counters are interconnected so that when enabled by said circuit means said flip-flop circuits count to said preset number of clock pulses to reach the lockup condition and reset in the event that the flip-flops are disabled prior to reaching the lockup condition, and each of said first and second lockup counters includes a decoder circuit responsive to the lockup condition and the reset signal from said reset circuit means for resetting the flip-flop circuits.

9. A noise rejection circuit as defined in claim 8 wherein:

said reset circuit means includes a separate decoder circuit for monitoring separate ones of said first and second lockup counters for generating reset signals when the flip-flop circuits in the associated ones of said lockup counters reach said preset count for reset.

10. A noise rejection circuit as defined in claim 9 wherein said circuit means includes:

input circuit means for said first lockup counter including a gating circuit responsive to the first state of said digital signals for enabling the flip-flop circuits of the first lockup counter to count clock pulses and responsive to a signal from the reset circuit means decoder circuit monitoring the second lockup counter to reset the first lockup counter flip-flop circuits, and input circuit means for said second lockup counter including a gating circuit responsive to the second state of said digital signals for enabling the flip-flop circuits of the second lockup counter to count clock pulses and responsive to a signal from the reset circuit decoder circuit monitoring the first lockup circuit to reset the second lockup counter flip-flop circuits.

11. A noise rejection circuit as defined in claim 10 including:

reset circuit means responsive to the flip-flop circuits in both the first and second lockup counters being set in the lockup condition for detecting the state of the digital signals and resetting said first lockup counter when the digital signal is in the second state and resetting the second lockup counter when the digital signal is in the first state.

12. In a system receiving a digital signal having first and second states and including a source of clock pulses having a repetition rate substantially greater than the digital signal, a noise rejection circuit comprising:

a first counter connected to said source of clock pulses, first circuit means receiving said digital signal and responsive to said first state thereof for enabling said first counter to count said clock pulses, first gate means connected to said first counter and responsive to a predetermined number of said clock pulses counted by said first counter for generating a first reset pulse;

a second counter connected to said source of clock pulses, second circuit means receiving said digital signal and responsive to said second state thereof for enabling said second counter to count said clock pulses, second gate means connected to said second counter and responsive to a predetermined number of said clock pulses counted by said second counter for generating a second reset pulse, fourth gate means having inputs connected to said second counter and said first gate means and responsive to another predetermined number of said clock pulses counted by said second counter and an absence of said first reset pulse for generating a second inhibit-reset signal, said other predetermined number greater than said predetermined number, said second circuit means connected to said fourth gate means and receiving said second inhibit-reset signal, said second circuit means responsive thereto for enabling said second counter to count said clock pulses during an absence of said digital signal of said second state, said fourth gate means and said second circuit means further responsive to said first reset pulse for resetting said second counter;

third gate means having inputs connected to said first counter and said second gate means and responsive to another predetermined number of said clock pulses counted by said first counter and an absence of said second reset pulse for generating a first inhibit-reset signal, said first circuit means connected to said third gate means and receiving said first inhibit-reset signal, said first circuit means responsive thereto for enabling said first counter to count said clock pulses during an absence of said digital signal of said first state, said third gate means and said first circuit means further responsive to said second reset pulse for resetting said first counter;

means connected to at least one of said counters for generating a digital output signal, and a reset circuit means receiving said digital signal and having inputs connected to said third and fourth gate means, and responsive to the presence of both of said first and second inhibit-reset signals for resetting said first counter when said digital signal is in said second state and resetting said second counter when said digital signal is in said first state.

* * * * *